United States Patent
Youn (10) Patent No.: US 12,534,558 B2
(45) Date of Patent: Jan. 27, 2026

(54) POLYMER TERMINATED WITH POLYAROMATIC HYDROCARBON

(71) Applicant: G-3 Chickadee Purcaser, LLC, Akron, OH (US)

(72) Inventor: Gyusaang Youn, Copley, OH (US)

(73) Assignee: G-3 Chickadee Purchaser, LLC, Akron, OH (US)

( * ) Notice: Subject to any disclaimer, the term of this patent is extended or adjusted under 35 U.S.C. 154(b) by 424 days.

(21) Appl. No.: 17/933,868

(22) Filed: Sep. 21, 2022

(65) Prior Publication Data

US 2024/0109996 A1    Apr. 4, 2024

(51) Int. Cl.
  *C08F 279/02*    (2006.01)

(52) U.S. Cl.
  CPC ................ *C08F 279/02* (2013.01)

(58) Field of Classification Search
  CPC ............... C08F 279/02; C08F 279/00
  See application file for complete search history.

(56) References Cited

U.S. PATENT DOCUMENTS

| | | | |
|---|---|---|---|
| 5,210,145 A * | 5/1993 | Lawson | C08C 19/44 |
| | | | 525/289 |
| 2003/0130535 A1 | 7/2003 | Deschler et al. | |
| 2010/0036026 A1* | 2/2010 | Hogan | C08K 5/55 |
| | | | 524/174 |

* cited by examiner

*Primary Examiner* — Randy P Gulakowski
*Assistant Examiner* — Holly Grace Hester
(74) *Attorney, Agent, or Firm* — Jackson Walker LLP; Leisa Talbert Peschel (57) ABSTRACT

A functionalized elastomer includes the reaction product of a living elastomeric polymer and a polyaromatic hydrocarbon terminator. The polyaromatic hydrocarbon terminator may be selected from 2-naphthaldehyde, 9-anthracenecarboxaldehyde, and 1-pyrenecarboxaldehyde. The functionalized elastomer may be compounded in a rubber composition which may be used to form a tire.

17 Claims, 4 Drawing Sheets

```
┌─────────────────────────────────────┐
│      FORM VINYLARENE                │
│             215                     │
└─────────────────────────────────────┘
                 │
┌─────────────────────────────────────┐
│  INITIATE VINYLARENE TO POLYMERIZE  │
│  BUTADIENE AND STYRENE TO PRODUCE   │
│   FUNCTIONALIZED ELASTOMER WITH     │
│      POLYAROMATIC HEAD GROUP        │
│                225                  │
└─────────────────────────────────────┘
                 │
┌─────────────────────────────────────┐
│   TERMINATE WITH POLYAROMATIC       │
│ HYDROCARBON TO FORM BIFUNCTIONAL    │
│      POLYAROMATIC ELASTOMER         │
│                235                  │
└─────────────────────────────────────┘
                 │
┌─────────────────────────────────────┐
│  COMPOUND FUNCTIONALIZED POLYMER    │
│  WITH ADDITIVES (E.G., CARBON BLACK)│
│                240                  │
└─────────────────────────────────────┘
                 │
┌─────────────────────────────────────┐
│  FORM COMPOSITION INTO RUBBER ARTICLE│
│                250                  │
└─────────────────────────────────────┘
```

POLYMER TERMINATED WITH POLYAROMATIC HYDROCARBON

BACKGROUND

The molecular structure of carbon black is mainly loosely packed graphite with defects such as unsaturated bonds and heteroatom functionalities. Considering carbon black manufacturing processes, the likelihood of a carbon black particle having a reactive chemical functional group for polymer bonding in a well-dispersed and controlled manner is very low. Hence, approaches like targeting formations of covalent bonds between carbon black and rubber are trivial.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations, better interaction between the filler and the rubbery polymer results in lower hysteresis and consequently tires made with such rubber formulations have lower rolling resistance. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results in higher tan delta values at 0° C. which is indicative of better traction characteristics.

There is a growing demand for functionalized polymers. Functionalized polymers can be synthesized through various living/controlled polymerization techniques. In the living polymerization process based on active carbanionic center, metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

The present application relates to the synthesis of functionalized polymers and their use in rubber formulations and tire materials. In general, to achieve the best tire performance properties, functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

The interaction between rubber and carbon black has been attributed to a combination of physical absorption (van der Waals force) and chemisorption between the oxygen containing functional groups on the carbon black surface and the rubber (see D. Rivin, J. Aron, and A. Medalia, Rubber Chem. & Technol. 41, 330 (1968) and A. Gessler, W. Hess, and A Medalia, Plast. Rubber Process, 3, 141 (1968)). Various other chemical modification techniques, especially for styrene-butadiene rubber made by solution polymerization (S-SBR), have also been described for reducing hysteresis loss by improving polymer-filler interactions. In one of these techniques, the solution rubber chain end is modified with aminobenzophenone. This greatly improves the interaction between the polymer and the oxygen-containing groups on the carbon black surface (see N. Nagata, Nippon Gomu Kyokaishi, 62, 630 (1989)). Tin coupling of anionic solution polymers is another commonly used chain end modification method that aids polymer-filler interaction supposedly through increased reaction with the quinone groups on the carbon black surface. The effect of this interaction is to reduce the aggregation between carbon black particles which in turn, improves dispersion and ultimately reduces hysteresis.

It would be desirable to develop new compositions that exhibit improved polymer-filler interaction.

BRIEF DESCRIPTION

Disclosed, in some embodiments, is a functionalized elastomer including the reaction product of a living elastomeric polymer and a polyaromatic hydrocarbon terminator.

The polyaromatic hydrocarbon terminator may be selected from 2-naphthaldehyde, 9-anthracenecarboxaldehyde, and 1-pyrenecarboxaldehyde.

In some embodiments, the living elastomeric polymer is derived from at least one of isoprene, butadiene, and styrene. In particular embodiments, the living elastomeric polymer is derived from butadiene and styrene.

Rubber compositions containing the functionalized elastomer are also disclosed.

The rubber compositions may further include a filler such as carbon black.

Tires made from the rubber compositions are also disclosed.

Disclosed, in other embodiments, is a process of making a functionalized elastomer. The process includes terminating the reaction product of a living anionic elastomeric polymer with a polyaromatic hydrocarbon terminator.

The process may further include producing the living anionic elastomeric polymer by polymerizing at least one monomer in the presence of an organoaluminum initiator.

In some embodiments, the polyaromatic hydrocarbon terminator is used in an amount ranging from 0.05 to 5 molar equivalents based on the lithium in the organoaluminum initiator.

The polyaromatic hydrocarbon terminator may include an aldehyde group.

In some embodiments, the at least one monomer comprises a diene monomer.

In particular embodiments, the diene monomer is selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

The at least one monomer may further include a styrenic monomer.

In some embodiments, the process further includes providing a modifier during the production of the living anionic elastomeric polymer.

The modifier may be selected from methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine, or an oligomeric oxolanyl alkane such as 2,2-di-tetrahydrofuryl propane (DTP).

In some embodiments, the process further includes providing a quenching reagent after the termination of the reaction product.

Disclosed, in further embodiments, is a process for producing a tire. The process includes vulcanizing a rubber composition comprising carbon black and a functionalized elastomer; wherein the functionalized elastomer comprises polyaromatic hydrocarbon residue terminal groups.

The process may further include producing the functionalized elastomer by terminating the reaction product of a living anionic elastomeric polymer with a polyaromatic hydrocarbon terminator.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments and the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a functionalized polymer, a method of making the functionalized polymer, a rubber composition comprising the functionalized polymer, and a tire (e.g., a pneumatic tire) comprising the rubber composition.

The functionalized polymers include aromatic hydrocarbons at the polymer chain-end to induce a pi-pi interaction for better dispersion of filler in a polymer matrix. The aromatic hydrocarbons may be introduced by terminating a living polymer with an aromatic hydrocarbon or derivative. It is also possible to introduce an aromatic hydrocarbon-containing group via an initiator approach.

The functionalized polymers may be monofunctional or bifunctional. In other words, the functionalized polymers may include one aromatic hydrocarbon end group or two aromatic hydrocarbon end groups. For the bifunctional polymer, the aromatic end groups may be the same or different. One may be introduced via an initiator and the other may be introduced via a terminator.

Non-covalent interactions between polymers and carbon black such as pi-pi interaction can be achieved by introducing an aromatic hydrocarbon group in the polymer chain-end to potentially improve tire properties. Improved pi-pi interaction can help breakdown of large agglomerates of carbon blacks into smaller particles, thereby allowing better dispersion of fillers. The aromatic hydrocarbons may include an aldehyde group. Non-limiting examples include 2-naphthaldehyde, 9-anthracenecarboxaldehyde, and 1-pyrenecarboxaldehyde.

However, the aromatic hydrocarbon may include functional groups other than aldehydes in some embodiments. For example, the terminator may have the structure Ar—X, wherein Ar is a fused ring structure and X is a halide (e.g., Cl, Br, I). Alternatively, the terminator may have the structure Ar—C=N—R or Ar—N=C—R, wherein Ar is a fused ring structure. R may be any fused ring structure displaying aromaticity. Non-limiting examples include naphthalene, biphenyl, fluorene, anthracene, phenanthrene, phenalene, tetracene, chrysene, triphenylene, pyrene, pentacene, perylene, benzo[a]pyrene, corannulene, benzo[ghi]perylene, coronene, ovalene, benzo[c]fluorene, and derivatives thereof.

The terminator may have the structure Ar—X, wherein Ar is a fused ring structure and X is a halide (e.g., Cl, Br, I).

The fused ring structure is not limited to a particular number of rings and generally includes up to 60 carbon atoms.

Figure 1:
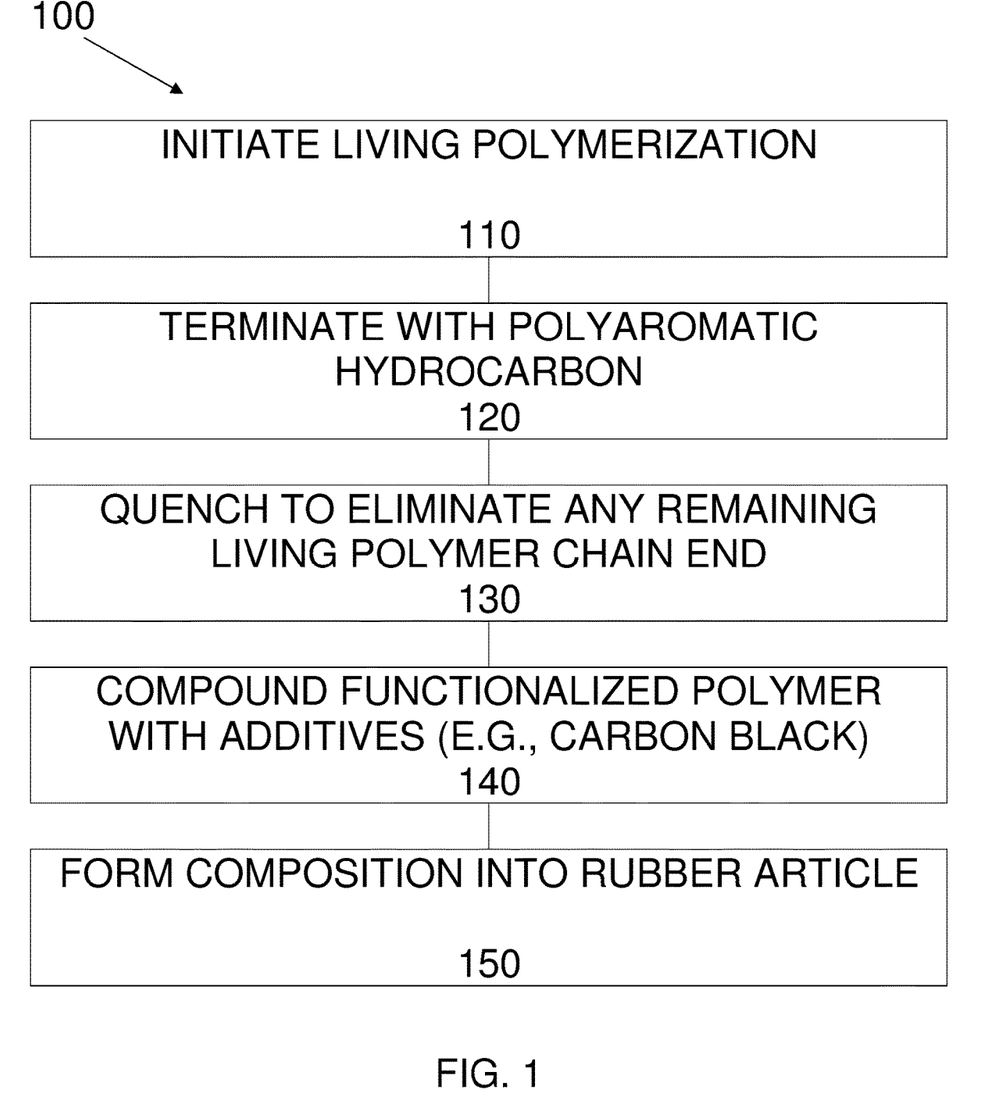
FIG. 1 is a flow chart illustrating a process of forming a rubber article in accordance with some embodiments of the present disclosure.

FIG. 1 illustrates a non-limiting example of a process 100 of forming a rubber article in accordance with some embodiments of the present disclosure. The process 100 includes initiating living polymerization 110, terminating the living polymerization with a polyaromatic hydrocarbon 120, quenching to eliminate any remaining living polymer that was not consumed by the reaction with the terminator 130, compounding the functionalized polymer 140, and forming a rubber article 150.

The aromatic hydrocarbon terminator may be used in an anionic polymerization such as that initiated 110 by lithium compounds.

The initiator used to initiate the polymerization employed in synthesizing the living rubbery polymer that is functionalized in accordance with this disclosure is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred anionic initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator. Very finely divided lithium having an average particle diameter of less than 2 microns can also be employed as the initiator for the synthesis of living rubbery polymers that can be functionalized with the polyaromatic terminator. U.S. Pat. No. 4,048,420, which is incorporated herein by reference in its entirety, describes the synthesis of lithium terminated living polymers utilizing finely divided lithium as the initiator. Lithium amides can also be used as the initiator in the synthesis of living polydiene rubbers (see U.S. Pat. No. 4,935,471 the teaching of which are incorporated herein by reference with respect to lithium amides that can be used as initiators in the synthesis of living rubbery polymer).

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Temperatures at which the polymerization reaction is carried out can be varied over a wide range. Usually, the temperature can be varied from extremely low temperatures such as −78° C. up to high temperatures, such as 150° C. or higher. Thus, the temperature is not a critical factor. It is generally preferred, however, to conduct the reaction at a temperature in the range of from about 10° C. to about 90° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

The rubbery polymers that are functionalized with a polyaromatic hydrocarbon terminator are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The polymerization may include a modifier such as methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine, or an oligomeric oxolanyl alkane such as 2,2-di-tetrahydrofuryl propane (DTP).

The metal terminated living rubbery polymers can be of virtually any molecular weight. However, the number average molecular weight of the living rubbery polymer will typically be within the range of about 50,000 to about 500,000 g/mol. It is more typical for such living rubbery polymers to have number average molecular weights within the range of 100,000 to 600,000 g/mol.

The metal terminated living rubbery polymer can be functionalized 120 by simply adding a stoichiometric amount of a terminator to a solution of the rubbery polymer (a rubber cement of the living polymer). In other words, approximately one mole of the terminator is added per mole of terminal metal groups in the living rubbery polymer. The number of moles of metal end groups in such polymers is assumed to be the number of moles of the metal utilized in the initiator. It is, of course, possible to add greater than a stoichiometric amount of the terminator. In many cases it will be desirable to utilize a slight excess of the terminator to ensure that at least a stoichiometric amount is actually employed or to control the stoichiometry of the functionalization reaction. In some embodiments, from 0.05 to 5 moles of the terminator will be utilized per mole of metal end groups in the living polymer being treated. In most cases from about 0.8 to about 1.1 moles of the terminator will be utilized per mole of metal end groups in the living polymer being treated. In the event that it is not desired to functionalize all of the metal terminated chain ends in a rubbery polymer then, of course, lesser amounts of the terminator can be utilized.

The terminator will react with the metal terminated living rubbery polymer over a very wide temperature range. For practical reasons, the functionalization of such living rubbery polymers will normally be carried out at a temperature within the range of 0° C. to 150° C. In order to increase reaction rates, in most cases it will be preferred to utilize a temperature within the range of 20° C. to 100° C., with temperatures within the range of 50° C. to 80° C. being most preferred. The capping reaction is very rapid and only very short reaction times within the range of 0.5 to 4 hours are normally required. However, in some cases reaction times of up to about 24 hours may be employed to ensure maximum conversions.

One or more polyaromatic hydrocarbon terminators may be utilized. Non-limiting examples of suitable polyaromatic hydrocarbon terminators include naphthalene, acenaphthene, fluorene, acenaphthylene, anthracene, phenanthrene, fluoranthene, pyrene, benzo[a]anthracene, chrysene, benzo[k]fluoranthene, benzo[b]fluoranthene, benzo[a]pyrene, dibenz[a,h]anthracene, indeno[1,2,3-cd]pyrene, and benzo[g,h,i]perylene. Derivatives of these materials are also contemplated. In some embodiments, the derivative comprises at least one aldehyde functional group.

Particular examples include 2-naphthaldehyde, 9-anthracenecarboxaldehyde, and 1-pyrenecarboxaldehyde.

naphthaldehyde    9-anthracenecarboxaldehyde 2-1-pyrenecarboxaldehyde It should be understood that the terminator is not limited to polyaromatic hydrocarbons containing only C and H. Heteroatom-containing fused-ring structures are also contemplated. Moreover, the fused-ring structures may or may not have aromaticity. The rings may be 3-, 4-, 5-, 6-, 7-, 8-, or 9-membered rings.

Additionally non-limiting examples include benz[a]acridine derivatives, 7H-dibenzo[c,g]carbazole derivatives, dibenzo[b,d]furan, indeno[1,2,3-cd]fluoranthene, and the like.

After the functionalization reaction is completed, it will normally be desirable to quench 130 or "kill" any living polydiene chains which remain. This can be accomplished by adding an alcohol, such as methanol or ethanol, to the polymer cement after the functionalization reaction is completed in order to eliminate any living polymer that was not consumed by the reaction with the terminator. The end-group functionalized polydiene rubber can then be recovered from the solution utilizing standard techniques.

In some embodiments, the quenching is performed with a mixture containing an alcohol species (e.g., isopropanol) and a carboxylic acid (e.g., stearic acid). The carboxylic acid may exhibit solubility in hexane.

The functionalized polymer may be compounded 140 into a rubber composition.

The rubber composition may optionally include, in addition to the functionalized polymer, one or more rubbers or elastomers containing olefinic unsaturation. The phrases "rubber or elastomer containing olefinic unsaturation" or "diene-based elastomer" are intended to include both natural rubber and its various raw and reclaim forms as well as various synthetic rubbers. The terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect, the at least one additional rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed may be precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH3(CH2)6C(=O)—S—CH2CH2CH2Si(OCH2CH3)3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl)phenol, p-phenylenediamines, butylated reaction products of p-cresol and Dicyclopentadiene (DCPD), polyphenolic anitioxidants, hydroquinone derivatives, quinoline, diphenylene antioxidants and thioester antioxidants and the like and their blends. Some representative trade names of suitable products include WINGSTAY® S antioxidant, WINGSTAY® T antioxidant, POLYSTAY® C antioxidant, POLYSTAY® 100 antioxidant, POLYSTAY® 100 AZ antioxidant, POLYSTAY® 200 antioxidant, WINGSTAY® L antioxidant, WINGSTAY® LHLS antioxidant, POLYSTAY® K antioxidant, POLYSTAY® 29 antioxidant, and WINGSTAY® SN-1. The antioxidants and antiozonants used will preferably be non-staining and non-migratory.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be formed 150 into a variety of different types of articles (e.g., rubber tire components). For example, the rubber component may be a tread (including tread cap and tread base), sidewall, apex, chafer, sidewall insert, wirecoat or innerliner. In one embodiment, the component is a tread.

The pneumatic tire may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

As an alternative or in addition to introducing aromatic end functionality via a terminator as described herein, such functionality may be provided via an initiator process.

Figure 2:
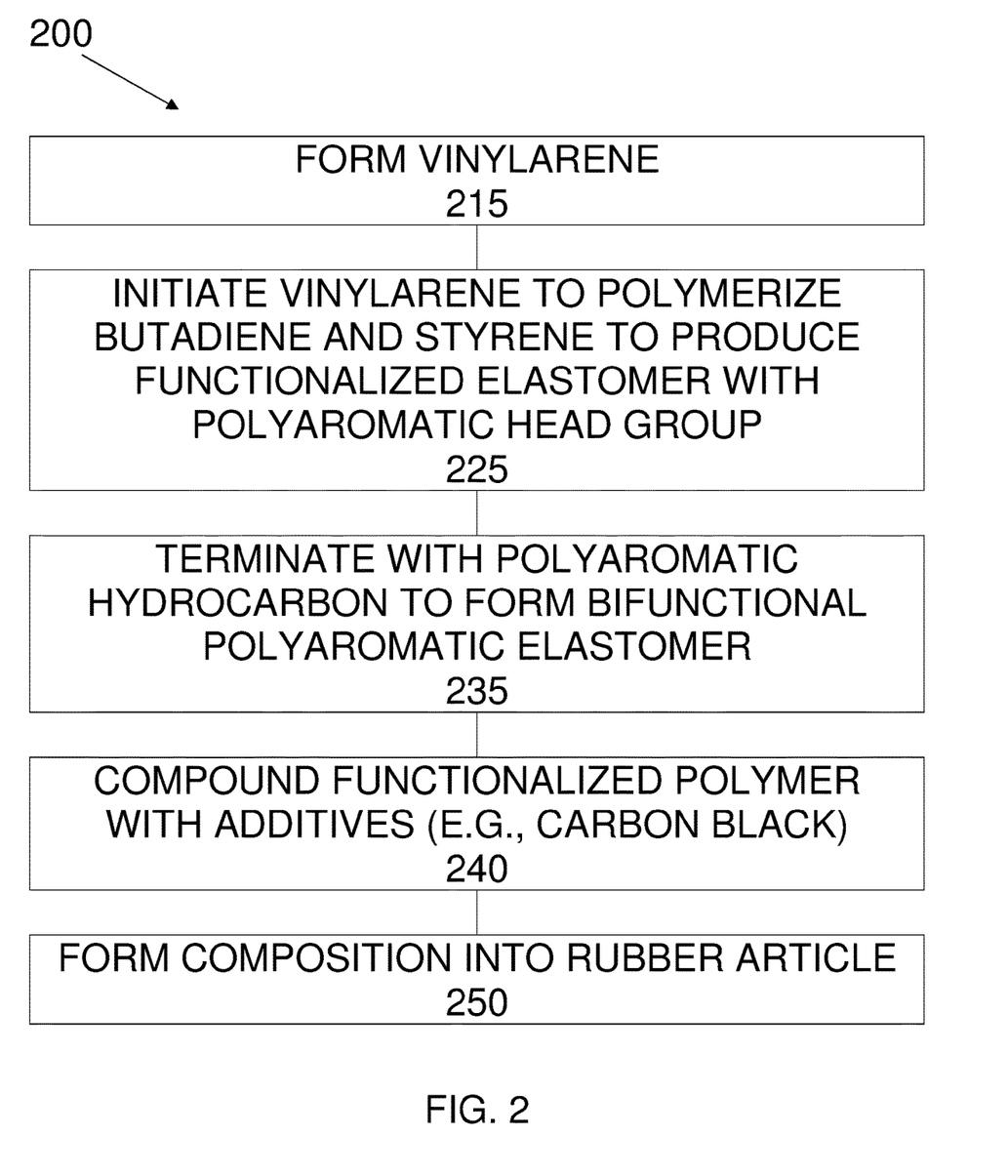
FIG. 2 is a flow chart illustrating another process of forming a rubber article in accordance with some embodiments of the present disclosure.

FIG. 2 illustrates a non-limiting example of a process 200 of forming a rubber article in accordance with some embodiments of the present disclosure. The rubber article produced according to this process will include a bifunctional elastomer because both the initiator and terminator are utilized to introduce polyaromatic functionality. The process 200 includes forming a vinylarene 215, initiating to form a monofunctional elastomer with a polyaromatic head group 225, terminating with a polyaromatic terminator to form a bifunctional polyaromatic elastomer 235, compounding the functionalized polymer 240, and forming a rubber article 250. The vinylarene may be formed 215 by transforming an aromatic compound containing an aldehyde or other reactive group via a Wittig reaction:

Subsequently, the vinylarene can be initiated 225 using an initiator (e.g., n-butyl lithium) to polymerize butadiene and styrene to produce a monofunctional elastomer with a polyaromatic head group. The monofunctional elastomer containing the polyaromatic head group can be further functionalized using a polyaromatic chain terminator 235 to yield a bifunctional polyaromatic elastomer. As an alternative, it may be possible to produce a monofunctional elastomer using the vinylarene during initiation without utilizing the polyaromatic chain terminator.

The following examples are provided to illustrate the devices and methods of the present disclosure. The examples are merely illustrative and are not intended to limit the disclosure to the materials, conditions, or process parameters set forth therein.

Examples

All examples were analyzed by GPC to determine the degree of molecular weight degradation and to determine the polymer recovery, as an indicator of insoluble fraction.

SBRs functionalized with polyaromatic hydrocarbons were prepared from a continuous chain run process utilizing two reactors at the temperatures between 85-95° C. Polymerization was first initiated with n-BuLi (0.04 phm) TMEDA was used as a modifier with the loading of 0.1 equivalent to n-BuLi. Upon the desired Mooney (Base Mooney) of polymer was achieved, the polymer cement was transferred to a termination reactor and a polyaromatic hydrocarbon terminator with the loading of 1.0-1.2 equivalent to n-BuLi was introduced to the flow. After 1 h of residence time has passed, the flow came into a short stop, containing Isol/Sterax (1.0 phm/1.0 phm). An antioxidant, PolystayK (0.5 phm) was introduced to the polymer cement and measured Mooney (Final Mooney). The polymer cements were finished using stripper and dried by passing through a rocket followed by oven drying (Finished Mooney).

Figure 3:
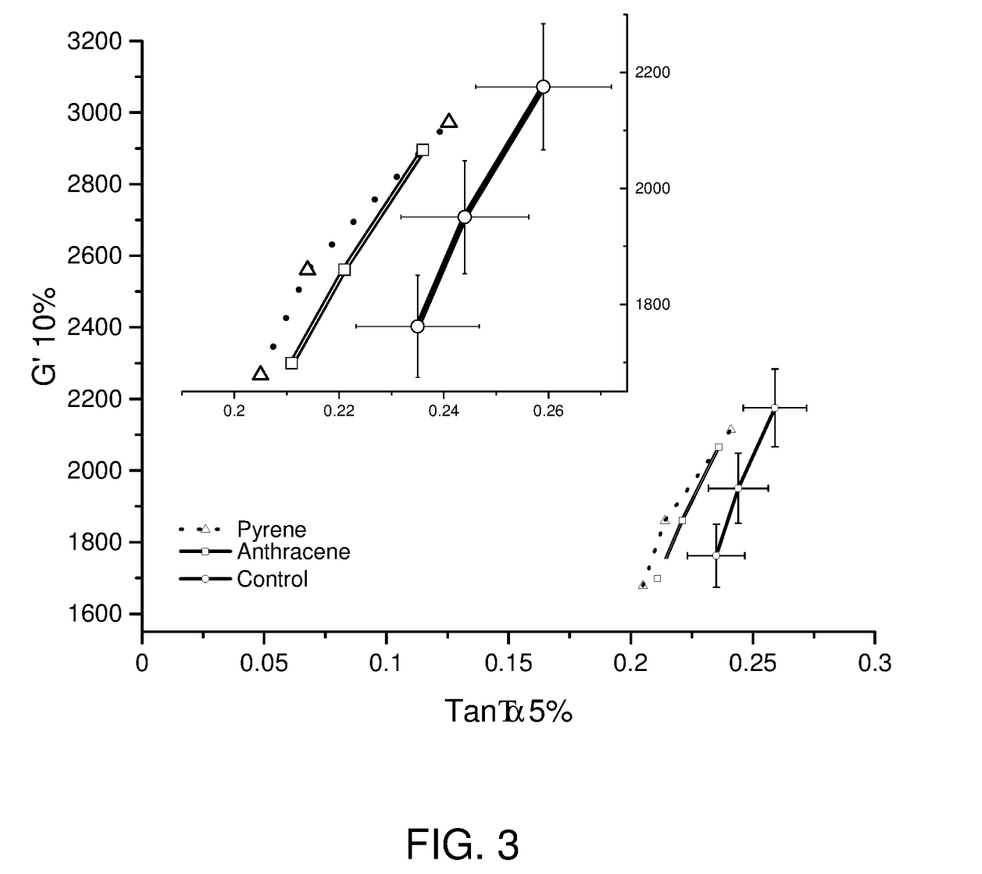
FIG. 3 is a graph showing the results of one of the examples.
Figure 4:
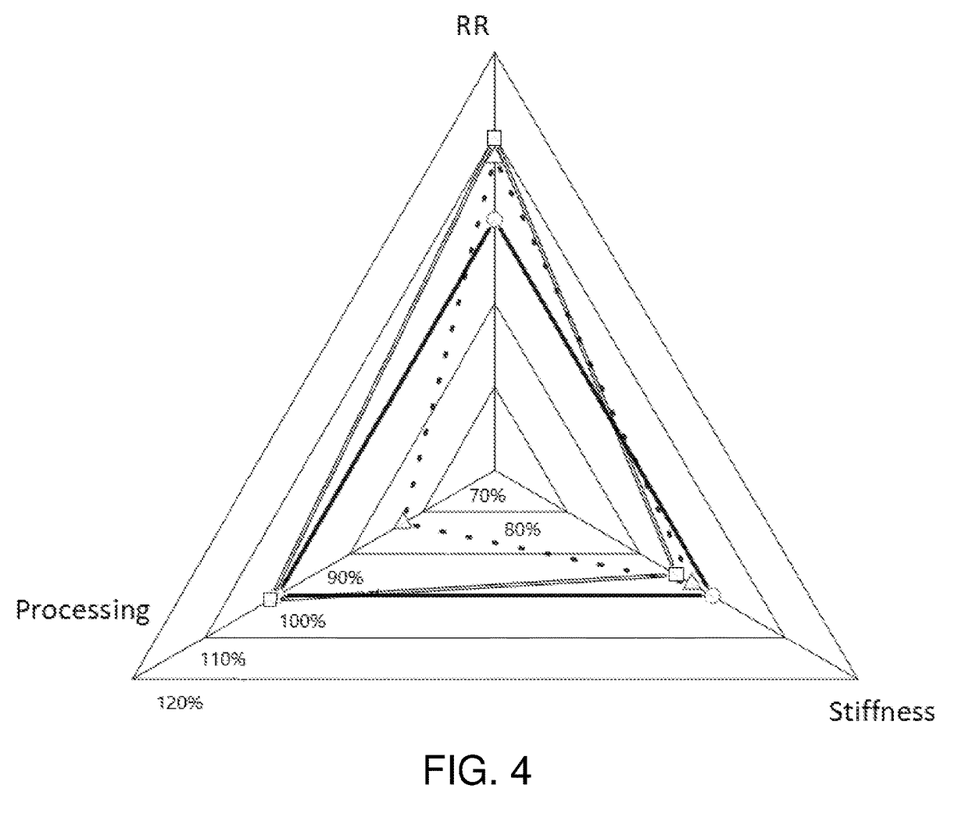
FIG. 4 is a chart illustrating the trade offs of one of the examples.

Compounding with these polyaromatic functional polymers showed 5-6% improvement in Tan d for PBd rich compounds and 7-10% improvement in Tan d for SBR rich compounds, 5% improvement in rebound for SBR rich compound, indicating improved filler-polymer interaction. Various parameters and results are summarized in the Tables below and tradeoffs are shown in FIGS. 3 and 4. FIG. 3 is a graph illustrating G' at 10% and tan delta at 5% for control without polyaromatic terminal functionality, pyrene functionality, and anthracene functionality. FIG. 4 is a spider chart illustrating the tradeoffs (processing, stiffness, and rolling resistance) for the same materials wherein the control for each property is at 100%.

|  |  |  |  | Initiator | | Modifier | | Temp (° C.) | |
|---|---|---|---|---|---|---|---|---|---|
| Example | Process | Type | Reagent | Load (phm) | Reagent | Equiv. | | R1 | R2 |
| A | Continuous | PBd | n-BuLi | 0.052 | TMEDA | 0.14 | | 87 | 87 |
| D |  |  |  | 0.052 |  | 0.14 |  |  | 87 |
| J |  |  |  | 0.053 |  | 0.14 |  |  | 87 |
| K |  |  |  | 0.038 |  | 0.15 |  |  | 87 |
| L |  | SBR |  | 0.04 |  | 0.1 |  |  | 87 |
| O |  |  |  | 0.04 |  |  |  |  | 87 |
| U |  |  |  | 0.04 |  |  |  |  | 92 |

|  | Terminator | | Quench | | Antioxidant | |
|---|---|---|---|---|---|---|
| Example | Reagent | Equiv. | Reagent | phm | Reagent | phm |
| A | None | — | Isol/Sterax | 1.0/1.0 | PolyStay K | 0.5 |
| D | 9-Anthracenecarboxaldehyde | 1 |  |  |  |  |
| J | 1-Pyrenecarboxaldehyde | 1 |  |  |  |  |
| K | None | — |  |  |  |  |
| L | None | — |  |  |  |  |
| O | 9-Anthracenecarboxaldehyde | 1 |  |  |  |  |
| U | 1-Pyrenecarboxaldehyde | 1 |  |  |  |  |

|  | Mooney | | | Finished GPC | | |
|---|---|---|---|---|---|---|
| Example | Target | Finished | β | Mn (kDa) | Mw (kDa) | Đ |
| A | 45 | 47.4 | 0.352 | 189.636 | 270.571 | 1.43 |
| D |  | 44.3 | 0.359 | 198.793 | 277.504 | 1.4 |
| J |  | 46.4 | 0.336 | 192.45 | 267.38 | 1.39 |
| K |  | 73.7 | 0.331 | 242.781 | 335.181 | 1.38 |
| L | 70 | 68.2 | 0.32 | 223.311 | 295.733 | 1.32 |
| O |  | 75.6 | 0.332 | 225.983 | 316.31 | 1.4 |
| U |  | 95.6 | 0.302 | 267.967 | 371.349 | 1.39 |

|  | Microstructure | | Tg (° C.) | |
|---|---|---|---|---|
|  | IR V | IR S | Finished | |
| Example | Finished | Finished | Onset | Inf'n |
| A | 14.60% |  | −93.3 | −90.7 |
| D | 15.00% |  | −93.5 | −91.4 |
| J | 15.50% |  | −93.5 | −91.2 |
| K | 15.00% |  | −93.7 | −91.9 |
| L | 11.90% | 8.50% | −90.2 | −87.1 |
| O | 11.90% | 8.00% | −89.4 | −86.2 |
| U | 11.70% | 8.90% | −89.1 | −86.2 |

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A functionalized elastomer comprising the reaction product of a living elastomeric polymer and a polyaromatic hydrocarbon terminator, the polyaromatic hydrocarbon terminator being 2-naphthaldehyde.

2. The functionalized elastomer of claim 1, wherein the living elastomeric polymer is derived from at least one of isoprene, butadiene, and styrene.

3. The functionalized elastomer of claim 1, wherein the living elastomeric polymer is derived from butadiene and styrene.

4. A rubber composition comprising the functionalized elastomer of claim 1 and a filler.

5. The rubber composition of claim 4, wherein the filler comprises carbon black.

6. A tire comprising the rubber composition of claim 4.

7. A process of making a functionalized elastomer comprising: terminating the reaction product of a living anionic elastomeric polymer with a polyaromatic hydrocarbon terminator, the polyaromatic hydrocarbon terminator being 2-naphthaldehyde.

8. The process of claim 7, further comprising:
   producing the living anionic elastomeric polymer by polymerizing at least one monomer in the presence of an organolithium initiator.

9. The process of claim 8, wherein the polyaromatic hydrocarbon terminator is used in an amount ranging from 0.05 to 5 molar equivalents based on the lithium in the organolithium initiator.

10. The process of claim 8, wherein the at least one monomer comprises a diene monomer.

11. The process of claim 10, wherein the diene monomer is selected from the group consisting of 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

12. The process of claim 10, wherein the at least one monomer further comprises a styrenic monomer.

13. The process of claim 8, further comprising:
providing a modifier during the production of the living anionic elastomeric polymer.

14. The process of claim 13, wherein the modifier is selected from the group consisting of methyltetrahydrofurfurylether, ethyltetrahydrofurfuryl ether, propyltetrahydrofurfuryl ether, butyltetrahydrofurfuryl ether, hexyltetrahydrofurfurylether, octyltetrahydrofurfuryl ether, dodecyltetrahydrofurfurylether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine, an oligomeric oxolanyl alkane and 2,2-di-tetrahydrofuryl propane (DTP).

15. The process of claim 7, further comprising:
providing a quenching reagent after the termination of the reaction product.

16. A process for producing a tire comprising: vulcanizing a rubber composition comprising carbon black and a functionalized elastomer; wherein the functionalized elastomer comprises polyaromatic hydrocarbon residue terminal groups derived from 2-naphthaldehyde.

17. A method for producing a functionalized elastomer, the method comprising:
terminating the reaction product of a living anionic elastomeric polymer with a polyaromatic hydrocarbon terminator, the polyaromatic hydrocarbon terminator being 2-naphthaldehyde.

* * * * *